United States Patent [19]

Cremer et al.

[11] E Patent Number: Re. 33,529

[45] Reissued Date of Patent: Jan. 29, 1991

[54] COVERING FOR WALL, CEILING OR FLOOR LININGS

[75] Inventors: Gottfried Cremer, Cologne; Martin Bard, Amberg, both of Fed. Rep. of Germany

[73] Assignee: Buchtal Gesellschaft mit beschrankter Haftung, Schwarzentfeld Opf, Fed. Rep. of Germany

[21] Appl. No.: 480,921

[22] Filed: Feb. 15, 1990

Related U.S. Patent Documents

Reissue of:

[64] Patent No.: 4,839,500
Issued: Jun. 13, 1989
Appl. No.: 10,510
Filed: Feb. 3, 1987

[30] Foreign Application Priority Data

Feb. 3, 1986 [DE] Fed. Rep. of Germany ..... 3603233

[51] Int. Cl.[5] ..... H05B 3/26

[52] U.S. Cl. ..... 219/213; 219/345; 219/543

[58] Field of Search ..... 219/213, 345, 528, 529, 219/548, 549, 543; 338/308, 309; 52/220, 385, 389, 390

[56] References Cited

U.S. PATENT DOCUMENTS

| | | | |
|---|---|---|---|
| 2,540,295 | 2/1951 | Schreiber | 219/213 |
| 2,569,961 | 10/1951 | Tidd | 219/213 |
| 2,762,896 | 9/1956 | Pendleton | 219/213 |
| 3,060,300 | 10/1962 | Horner | 219/345 |
| 3,223,825 | 12/1965 | Williams | 219/213 |
| 3,603,764 | 9/1971 | Martin | 219/345 |
| 3,974,360 | 10/1976 | Panzarino | 219/543 |
| 4,544,828 | 10/1985 | Shigenobu | 219/543 |
| 4,661,689 | 4/1987 | Harrison | 219/549 |
| 4,690,872 | 9/1987 | Kato | 219/548 |
| 4,699,677 | 10/1987 | Rooklyn | 52/309 |

FOREIGN PATENT DOCUMENTS

| | | | |
|---|---|---|---|
| 258407 | 2/1964 | Australia | 219/213 |
| 1175089 | 9/1984 | Canada | 219/213 |
| 0157179 | 10/1985 | European Pat. Off. . | |
| 2425442 | 12/1975 | Fed. Rep. of Germany | 219/543 |
| 2645286 | 5/1978 | Fed. Rep. of Germany | 219/213 |
| 59-56635 | 4/1984 | Japan | 219/358 |
| 552910 | 4/1943 | United Kingdom | 219/213 |

*Primary Examiner*—Teresa J. Walberg
*Attorney, Agent, or Firm*—Kinney & Lange

[57] ABSTRACT

A compound covering element for wall, ceiling or floor linings includes a ceramic tile provided with an electrically conductive coating on its back side which is heatable to thereby heat the tile. An electrically conductive coating on the visible side of the ceramic tile dissipates static electricity.

18 Claims, 1 Drawing Sheet

COVERING FOR WALL, CEILING OR FLOOR LININGS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a covering comprising ceramic tiles for wall, ceiling or floor linings, in which the ceramic tiles are provided with an electrically conductive coating or are themselves designed to be electrically conductive, and are connected to incoming and outgoing lines.

2. Description of the Prior Art

European laid-open print 0 157 179 describes a flat ceramic body provided on its side facing away from the visible side with an electrical resistance coating. In order to make it possible to give an optimal design to the radiating surface available on a wall, ceiling or floor surface to be lined therewith, to manage with as few electrical connecting elements as possible and to ensure an even radiation of heat, a tile is used that is pressed out of plastic ceramic starting material, rolled and fired and the electrical resistance coating is designed as a resistance layer made of a material in which non-metallic, electrically conductive particles have a large specific surface and not substantially changing their electrical conductivity in the case of a temperature increase are embodied in a carrier substance that is electrically non-conductive or only poorly conductive, this material being applied in such a way that the resistance coating has even electrical and thermal conductivity. This body is recognizably provided directly on the wall, ceiling or floor surface to be lined, whereby considerable difficulties may arise in particular when floors are being lined. Firstly, once it is selected, a system for heating all or part of the surface of the corresponding limits of the room can no longer be changed when the covering is completed. Secondly, if heated surfaces are covered by carpets, furniture or similar objects in the case of floor coverings, these areas heat up to a particularly high degree since the objects placed on the floor prevent the heat from dissipating to a large extent. The temperature prevailing on the limiting surface of a room, however, can only be regulated in accordance with one selected point on the corresponding limiting surface. Special switching circuits are either too elaborate or cannot be varied. Furthermore, in a large uninterrupted covering on the limits of a room, since it can only be supplied from the edge of the covering, one must use either large wire crosssections with a small operating voltage or, if small cross-sections are selected, accordingly high voltages, which may possibly endanger the persons using the room. If such a covering on the limits of a room is damaged, it is generally impossible, or at least extremely difficult to remove the damage.

SUMMARY OF THE INVENTION

Thus, the invention proposes that the ceramic tiles provided with an electrically conductive coating or themselves designed to be electrically conductive each be the part forming the visible side of a compound element bedded directly or indirectly on supports disposed at predetermined intervals on a stable substructure. In this way, each individual compound element can be connected in any desired manner to the incoming and outgoing lines, thereby allowing for locally different heating, for any compound element to be replaced without difficulty if it is damaged, and for individual compound elements to be combined into groups as desired so that certain areas of the covering on the limits of the room can be supplied with power individually. Further, it is possible any time to convert or regroup the individual compound elements subsequently since they can be supplied by separate switching circuits. Since the various compound elements are supplied individually there is also a possibility of saving a considerable amount of energy. Due to the fact that the compound elements are bedded directly or indirectly on supports on a stable substructure, there is space for the incoming lines, optionally combined into cable harnesses, this space also sufficing to accommodate switching elements and optionally other electrical control units, which can then be controlled or regulated from the outside.

It is advantageous, in a development of this invention, to dispose under the ceramic tile a supporting body that forms part of the compound element, which should be made of material that conducts heat poorly in order to prevent the supplied thermal output from flowing off downwardly into the substructure.

In order to increase the stability of the overall compound body further, at least the supporting body is surrounded by a frame that envelops at least the side limits of the compound element. This frame can also be designed as a trough that takes up the supporting body and optionally also the ceramic tile bedded thereon.

The invention makes it possible to provide both sides of the ceramic tile with an electrically conductive coating, the electrically conductive coating located on the visible side being selected with respect to its electrical resistance in such a way, for example if the covering is used as a floor covering in an operating room or the like, as to ensure that static electricity is constantly carried off while at the same time current is prevented from flowing off in a dangerous strength when deficiently insulated current-carrying parts are touched by the human body. Thus, the electrical coating can be selected in such a way that an electrical resistance is present in the range of $10^4$ to $10^6$ Q. The electrically conductive coating provided on the side facing away from the visible side, however, is selected in such a way as to allow for the covering tile to be heated to desired temperature values.

In a further embodiment, each compound element is expediently designed as a replaceable self-contained electrical unit, it being advantageous for the individual units each to be suitable for connection individually. Of course, corresponding current limiting elements or similar automatically acting switching elements can also be integrated into these electrical units.

The power supply to the ceramic tiles or groups thereof may be controllable or adjustable. The compound elements may be prefabricated bodies.

Since the covering is bedded on supports, there is also a possibility of laying the incoming and outgoing electrical lines within the supports because there are very favorable possibilities of contact from there on the point of support.

Since there is a possibility of supplying the electrical power to individual tiles or groups of tiles, protective low voltage may be applied because the power required for the particular tiles or groups of tiles has an upper limit. This also yields the possibility of providing on the secondary side of the transformers necessary for applying the protective low voltage a center tap that is grounded via a preferably adjustable resistor. This makes it possible to adjust the outgoing lines of the electrically conductive coating provided on the visible side with respect to the ground leakage resistance $\geqq 10^6$ Q and the local transition resistance $\geqq 50$ kQ.

However, if a higher operating voltage of 220 V, for example, is applied, this possibility is not given; the coatings on both sides of the tile must instead be electrically isolated. This is expediently effected by leaving continuous areas free from conductive glaze on the side of the ceramic tile facing away from the visible side.

DETAILED DESCRIPTION OF THE PREFERRED EMBODIMENTS

Figure 1:
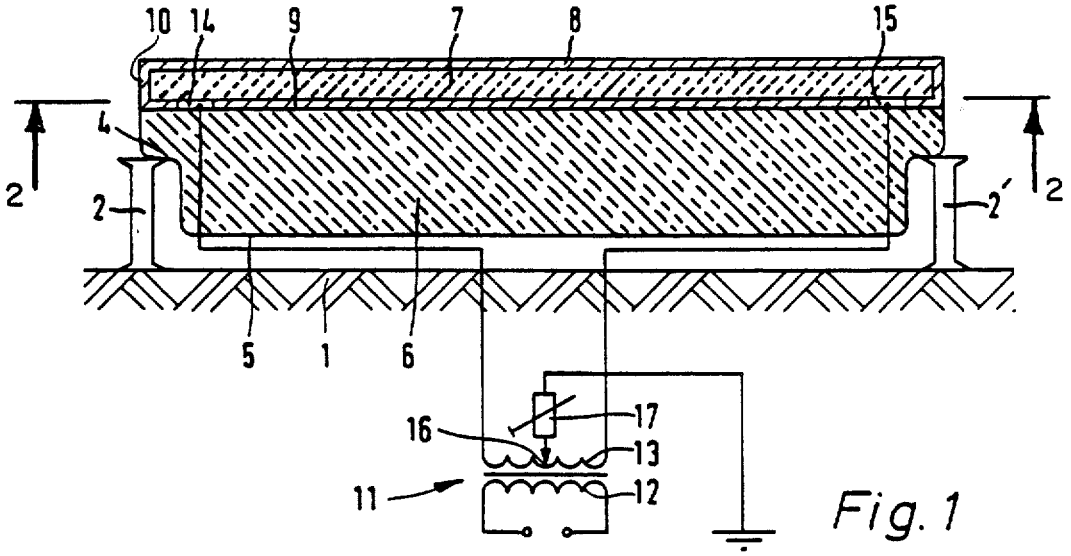
FIG. 1 a cross-section of a preferred embodiment of a compound element as can be used—as indicated schematically—as part of a covering according to the invention, including a preferred connection method for supplying energy by means of protective low voltage.

According to FIG. 1, supports 2, 2', etc., are set up on a stable substructure 1 at appropriate intervals, on which supports a trough 5 rests with its edge 4, which may also be designed as a simple frame, i.e. without a continuous bottom surface. This frame or trough 5 accomodates a supporting body 6 made of material that conducts heat poorly. On the upper end surface of this supporting body 6 there rests a ceramic tile 7 overlapping edge 4 of trough 5 in the exemplary embodiment shown, said tile either being designed to be electrically conductive itself or bearing on its visible side an electrically conductive coating 8 as in the embodiment shown. On the side facing away from the visible side of ceramic tile 7 there is a further electrically conductive coating 9. Coating 8 embraces the edge of ceramic tile 7 at 10 in the embodiment as in FIG. 1. Coating 8 has an electrical resistance in the range of $10^4$ to $10^6$ Q. Instead of a coating being selected with this resistance, ceramic tile 7 may also be designed to be electrically conductive itself.

Coating 9 is heatable, i.e. in the embodiment shown in FIG. 1 by energy supplied by means of protective low voltage via a transformer 11 whose primary side 12 is connected to 220 V a.c., for example. Secondary side 13 is connected to connecting blocks 14 and 15 of coating 9 and has a center tap 16 that is grounded via an adjustable resistor 17 that allows for the outgoing line of electrically conductive coating 8 provided on the visible side to be adjusted with respect to the ground leakage resistance $\geqq 10^6$ Q and the local transition resistance $\geqq 50$ kQ.

Figure 2:
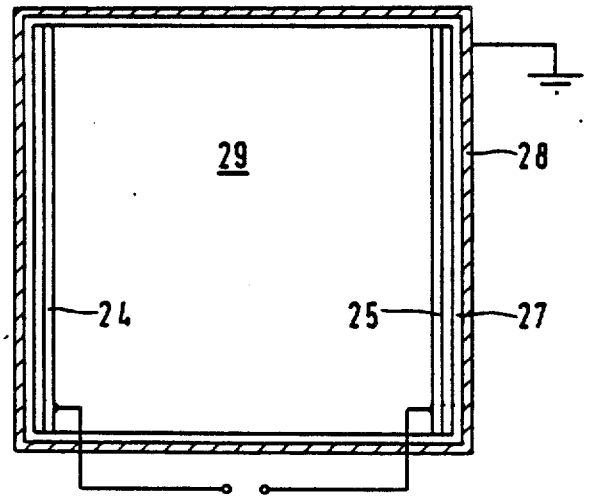
FIG. 2 a bottom view of a tile for electrically isolating the two electrically conductive coatings disposed on the visible side and on the opposite side, respectively.

FIG. 2 shows the connection and the arrangement of the coatings when working with higher operating voltage of 220 V a.c., for example. On the visible side of ceramic tile 27 there is electrically conductive coating 28 which is visible since it embraces the edges of tile 27. A coating 29 is provided on the side of ceramic tile 27 facing away from the visible side, said coating being electrically isolated from coating 28 since a corresponding edge strip is left free. On coating 29 there are connecting strips 24 and 25 which are connected to 220 V a.c. Coating 28 is grounded.

We claim:

1. A covering structure adapted for a double wall, ceiling or floor construction comprising a plurality of elements bedded directly or indirectly on supports disposed at predetermined intervals on a stable substructure, with each element being a compound covering element that, on its visible side, has a ceramic tile with a visible surface and a back surface, that has an electrically conductive glaze on the back surface of the ceramic tile which is adapted to be electrically charged whereby the ceramic tile is heated and that has means for dissipating static electricity.

2. The compound covering structure according to claim 1 wherein the element has a supporting body disposed under the ceramic tile and made of a material that conducts heat poorly.

3. The compound covering structure according to claim 2, characterized in that at least the supporting body is surrounded by a frame that envelops at least the side limits of the compound covering element.

4. The compound covering structure according to claim 3, characterized in that the frame is embodied by a trough that takes up the supporting body and optionally also the ceramic tile bedded thereon.

5. The compound covering structure according to claim 1, characterized in that the ceramic tile has an electrically conductive glaze on its visible surface to dissipate said static electricity.

6. The compound covering structure according to claim 5, characterized in that the resistance of the electrically conductive glaze on the visible surface of the ceramic tile is higher than the resistance of the electrically conductive glaze on the back surface of the ceramic tile.

7. The compound covering structure of claim 5 wherein the glaze on the visible surface of the ceramic tile has an electrical resistance in the range of $10^4$ to $10^6$ Ohm.

8. The compound covering structure according to claim 1, in which the ceramic tile is electrically conductive, characterized in that the resistance of each ceramic tile is higher than the resistance of the electrically conductive glaze on the back surface of the ceramic tile.

9. The compound covering structure according to claim 1, characterized in that each element is designed as a replaceable self-contained electrical unit and the units are suitable for connection individually.

10. The compound covering structure according to claim 1, wherein a power supply is connected to incoming and outgoing lines for the electrically conductive glaze, and further characterized in that the power supply to the ceramic tiles or groups thereof is controllable or adjustable.

11. The compound covering structure according to claim 10, characterized in that the incoming and outgoing lines are laid within the supports.

12. The compound covering structure according to claim 1, characterized in that the compound covering elements are prefabricated bodies.

13. The compound covering structure according to claim 1, wherein a power supply is connected to incoming and outgoing lines for the electrically conductive glaze, and further characterized in that the power supply is effected by means of protective low voltage.

14. The compound covering structure according to claim 13 wherein the protective low voltage is supplied from a secondary side of a transformer which has a center tap grounded by a resistor, with a primary side of the transformer being connected to the power supply.

15. The compound covering structure according to claim 14, characterized in that the resistor located in the center tap is an adjustable resistor.

16. The compound covering structure of claim 1, characterized in that the ceramic tile is itself electrically conductive to dissipate said static electricity.

17. A compound covering element for a double wall, ceiling or floor construction wherein a plurality of such elements are bedded directly or indirectly on supports disposed at predetermined intervals on a stable substructure, the compound cover element comprising:

a ceramic tile having a visible surface and a back surface;

an electrically conductive first glaze over the back surface of the ceramic tile, with the first glaze adapted to be electrically charged to heat the glaze and the ceramic tile; and an electrically conductive second glaze over the visible surface of the ceramic tile, with the second glaze having an electrical resistance higher than the electrical resistance of the conductive first glaze on the back surface of the ceramic tile to dissipate static electricity.

18. A compound covering element for a double wall, ceiling or floor construction wherein a plurality of such elements are bedded directly or indirectly on supports disposed at predetermined intervals on a stable substructure, the compound cover element comprising:

a ceramic tile having a visible surface and a back surface; and an electrically conductive glaze over the back surface of the ceramic tile, with the glaze adapted to be electrically charged to heat the glaze and the ceramic tile, wherein the ceramic tile itself is electrically conductive to dissipate static electricity and has an electrical resistance higher than the electrical resistance of the conductive glaze on the back surface thereof.

* * * * *